US007706527B2

(12) United States Patent
Lautenschläger

(10) Patent No.: US 7,706,527 B2
(45) Date of Patent: Apr. 27, 2010

(54) INTERRUPTION DEVICE FOR A DATA COMMUNICATION LINE

(76) Inventor: Christian Lautenschläger, Clos Belmont 2, Geneva (CH) 1208

( * ) Notice: Subject to any disclaimer, the term of this patent is extended or adjusted under 35 U.S.C. 154(b) by 179 days.

(21) Appl. No.: 12/096,384

(22) PCT Filed: Nov. 28, 2006

(86) PCT No.: PCT/IB2006/003376

§ 371 (c)(1),
(2), (4) Date: Jun. 6, 2008

(87) PCT Pub. No.: WO2007/066184

PCT Pub. Date: Jun. 14, 2007

(65) Prior Publication Data

US 2008/0304655 A1 Dec. 11, 2008

(30) Foreign Application Priority Data

Dec. 9, 2005 (CH) .................................... 1949/05

(51) Int. Cl.
*H04M 1/00* (2006.01)
*H04M 9/00* (2006.01)

(52) U.S. Cl. ................................. 379/441; 379/399.01

(58) Field of Classification Search ............ 379/399.01, 379/413.02, 413.03, 413.04, 441, 445, 387.01, 379/397

See application file for complete search history.

(56) References Cited

U.S. PATENT DOCUMENTS

| | | | |
|---|---|---|---|
| 5,661,786 | A | 8/1997 | Horn |
| 2005/0225915 | A1 | 10/2005 | Bader |

FOREIGN PATENT DOCUMENTS

| | | |
|---|---|---|
| DE | 10109628 | 9/2002 |
| DE | 102 13 351 C1 | 7/2003 |
| GB | 2389737 | 12/2003 |
| WO | WO 02073419 | 9/2002 |
| WO | 03/010627 A2 | 2/2003 |

*Primary Examiner*—Tuan D Nguyen
(74) *Attorney, Agent, or Firm*—Young & Thompson

(57) ABSTRACT

An interruption device arranged in a communication line including first and second cables in series, each including a first group of wires for the transmission of computer data and a second group of wires independent of the computer data, includes: a box provided with first and second input/output sockets with which the first and second cables, respectively, are connected; interrupters each connected between the first and second input/output sockets inside the box and actuable from outside the box, these interrupters being associated respectively with the wires of the first group; and transmission elements not including an interrupter and each connected between the first and second input/output sockets inside the box, these transmission elements being associated respectively with the wires of the second group. In a variant, the second input/output socket is replaced by two sockets associated with the interrupters and the transmission elements, respectively.

20 Claims, 4 Drawing Sheets

INTERRUPTION DEVICE FOR A DATA COMMUNICATION LINE

The present invention relates to a device for interrupting a communication line, more particularly a line transmitting computer data between a computer and a computer network.

Such a device has for instance been described in the document WO 03/010627. With it, its user can physically break the connection between the computer and the network, particularly so as to protect the computer against computer attacks coming from the network.

With wide-band connections such as ADSL, SDSL, etc., a computer may permanently remain connected with the Internet, which makes it particularly vulnerable to malevolent computer intrusions. Existing software of the firewall, anti-intrusion, or anti-virus type provides some security but is far from constituting an absolute protection. Interrupting the physical connection between the network and the computer while the computer is not used for data exchange is a very efficient complement of protection.

Devices for interruption used for this purpose have a major disadvantage, however, in that they disregard the possibility that a given data communication line may be used for transmitting signals that are independent of each other, that is, signals relating to different applications and/or coming or going to different networks. The communication lines meeting the requirements of the RJ45 standard, for instance, include different functional wire groups, one for computer data transmission, another for telephone signal transmission. By physically interrupting the communication line linking a computer with one or several networks, the devices for interruption known up to now prevent all the signals normally carried by this communication line from being transmitted to and from the computer, including the signals that constitute no risk in terms of computer security.

The present invention aims at remedying this disadvantage, and to this effect proposes a device for interruption according to appended claims 1 or 2, a communication line according to claims 9 or 10, a computer network according to claim 14, and a method for interruption according to claim 15, while particular embodiments of the invention are defined in the dependent claims.

Further characteristics and advantages of the present invention will become obvious when reading the following detailed description that is given while referring to the appended drawings in which FIG. 1 shows the exterior of an interruption device according to the invention;

Figure 1:
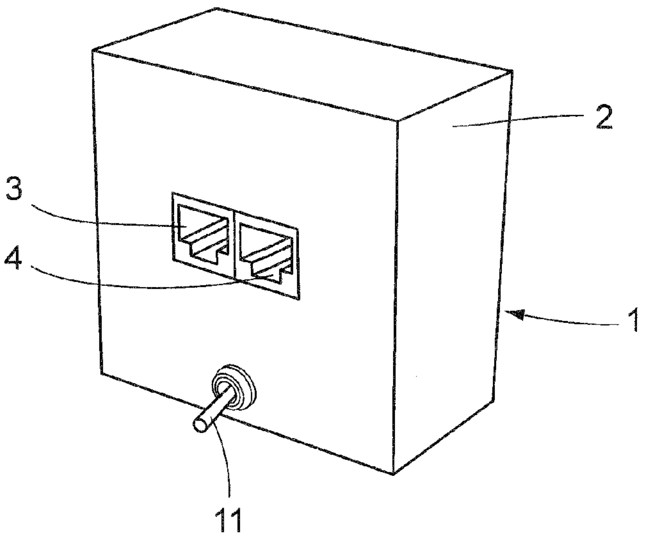
Figure 2:
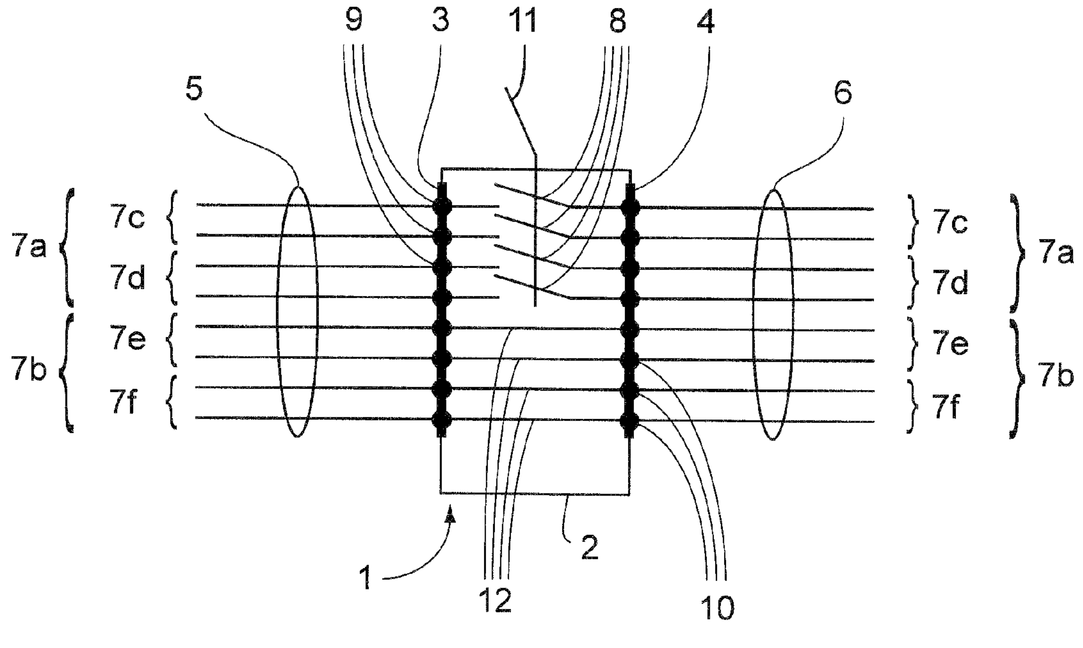
FIG. 2 is an electrical circuit of an interruption device according to a first embodiment of the invention.

Referring to FIGS. 1 and 2, a device according to the invention designated with the reference numeral 1, for interrupting a communication line comprises a box 2 having two input/output sockets 3, 4 on one of its faces. The input/output sockets 3, 4 are intended to receive respectively the plugs of two cables 5, 6 allowing these cables to be connected in series. When plugged in the sockets 3, 4, cables 5, 6 together with the interruption device 1 constitute said communication line.

In the example illustrated, the input/output sockets 3, 4 and the cables 5, 6 are of the RJ45 type. Thus, cables 5, 6 each include a first group of wires 7*a* composed of two wire pairs called the "orange pair" 7*c* and the "green pair" 7*d*, and a second group of wires 7*b* composed of another two wire pairs called the "blue pair" 7*e* and the "brown pair" 7*f*. The first and second wire groups 7*a*, 7*b* are intended for a transmission of mutually independent respective signals. More precisely, the first group of wires 7*a* is intended for transmitting computer data, while the blue pair 7*e* of the second group of wires 7*b* is intended for a transmission of telephone (voice) signals. The brown pair 7*f* of the second group of wires 7*b* is not yet used in the RJ45 standard. In practice, the wires of cables 5, 6 are not necessarily arranged as illustrated in FIG. 2; in general, they are twisted and the pairs may cross over at sockets 3, 4.

Inside the box 2, the interruption device 1 according to the invention comprises interrupters 8, four in the example illustrated, each connected between the input/output sockets 3, 4, more precisely between a respective electrical contact 9 of socket 3 and a respective electrical contact 10 of socket 4. These interrupters 8 are respectively associated with the wires of the first group 7*a* of each of the cables 5, 6, and can be actuated simultaneously from outside the box 2 through a manual control member 11 provided on one of the sides of box 2. Interrupters 8 can thus assume together a closed position in which, when cables 5, 6 are connected with the interruption device 1, more precisely with the electrical contacts 9, 10 of sockets 3, 4, the wires of the first group 7*a* of cable 5 are linked respectively to the corresponding wires of the first group 7*a* of cable 6, thus allowing data to be exchanged between cables 5, 6 across box 2, and an open position (illustrated in FIG. 2) in which the wires of the first group 7*a* of cable 5 are disconnected from the wires of the first group 7*a* of cable 6.

Inside of box 2, the interruption device 1 according to the invention also comprises transmission means consisting of conductors 12, four in the example illustrated, each connected between the input/output sockets 3, 4, more precisely between a respective electrical contact 9 of socket 3 and a respective electrical contact 10 of socket 4. These conductors 12 are associated respectively with the wires of the second group 7*b* of each of the cables 5, 6. When the cables 5, 6 are connected to the interruption device 1, these conductors 12, respectively link the wires of the second group 7*b* of cable 5 with the corresponding wires of the second group 7*b* of cable 6, with no interruption possible.

The inside of the interruption device 1 according to the invention with the interrupters 8 and the conductors 12 preferably is realized as a printed circuit.

Thus, the interruption device 1 according to the invention permits interruption of the data communications between cables 5, 6 while letting through any signals that are independent of said data and are transmitted by the second group of wires 7*b* of cables 5, 6. In the case of the RJ45 standard, more particularly, the telephone signals carried by the blue pair 7*e* of the second group of wires 7*b* can continue to be exchanged across box 2 while the exchange of data carried by the first group of wires 7*a* is interrupted.

Figure 3:
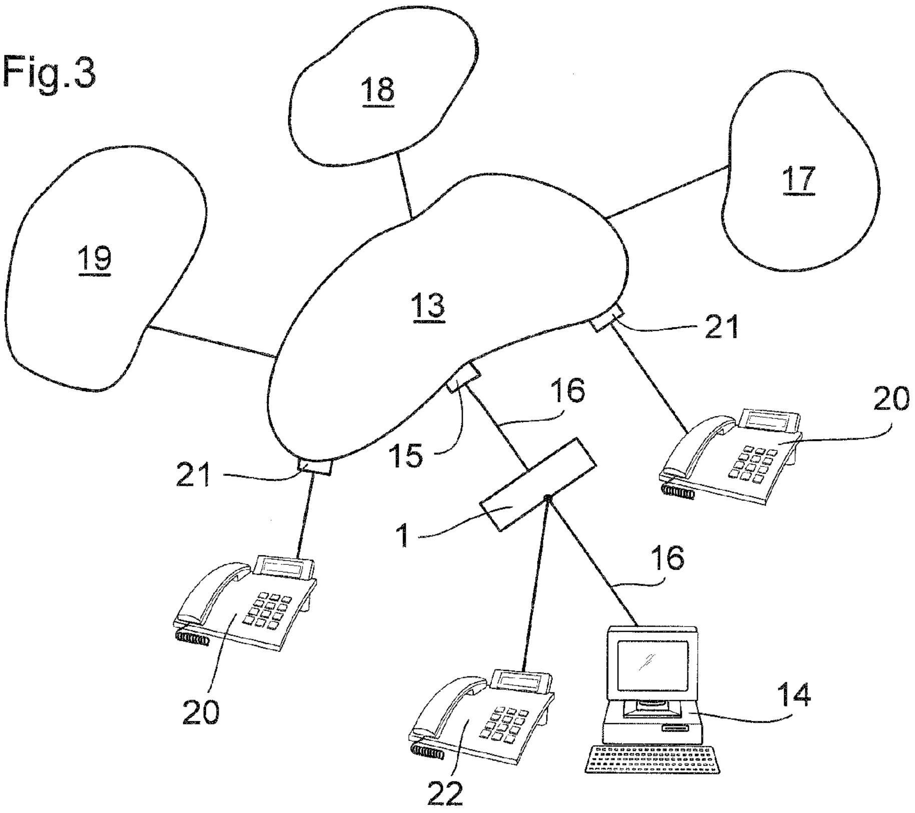
FIG. 3 is a scheme of a computer system comprising the interruption device according to the invention.

FIG. 3 shows an example of a computer system in which the interruption device 1 according to the invention can be used. This system comprises a local computer network 13, for instance of the Ethernet type, with a certain number of computers interconnected by RJ45 wiring. At least one of these computers, designated with the reference numeral 14, is linked to the rest of the network 13 by a communication line such as that illustrated in FIG. 2, that is, an interruption device 1 according to the invention is connected between this computer 14 and the corresponding network socket 15 by cables 16 of the RJ45 type. The local computer network 13 may be linked with one or several further computer or non-computer networks such as a worldwide computer network 17 (Internet), a public switched telephone network 18, and another local computer network 19. The connection between the local computer network 13 and the Internet 17 is typically realized via a DSL modem, and that between the local computer network 13 and the other local computer network 19 via a proprietary line. The public switched telephone network 18 may be connected with an automatic local exchange serving as the starting point for telephone lines connected to a distribution panel of the local computer network 13, the distribution panel being connected with the different network sockets of the local computer network 13 by RJ45 cables.

In the configuration illustrated in FIG. 3, the first group of wires of each of the RJ45 cables of the local computer network 13 serves for the transmission of computer data exchanged between the computers of the local network 13, as well as of the computer data exchanged between these computers and the Internet 17. The second group of wires may be used to transmit the computer data exchanged between the computers of the local computer network 13 and the computers of the other local computer network 19. In a variant, the second group of wires of the RJ45 cables that are connected between the distribution panel and the network sockets may serve to transmit telephone signals, so as to allow conventional telephones 20 plugged into network sockets 21 of the local computer network 13 to communicate with the public switched telephone network 18.

In practice, the interruption device 1 is placed next to the computer 14 in order to become readily accessible for the user of this computer 14. The user may thus interrupt at will the physical link defined by the first group of wires of cables 16 that connect the computer 14 with the network socket 15, simply by actuating the manual control member 11, in order to protect computer 14 against potential computer intrusions coming from the Internet 17 or even from the local network 13. The user may trigger such an interruption in particular when computer 14 is not used, or is used but not in order to exchange data with networks 13, 17. Other reasons may induce the user to open the interrupters 8 of the interruption device 1. It may for example be useful to block the data transmission between computer 14 and the networks 13, 17 in order to carry out an anti-virus check or another security operation in computer 14, in order to close the numerous display windows that open up automatically (pop-up windows) when consulting certain Internet sites, or in order to facilitate the use of sensitive software demanding large system resources, such as DVD burning software, 3D-design software, etc.

The transmission of telephone signals or of computer signals associated with the local network 19 in the second group of wires of cables 16 is not affected when opening the interrupters 8 of the interruption device 1. Thus, in the first case telephone signals can continue to be exchanged via the distribution panel of the local computer network 13 between the public switched telephone network 18 and a telephone 22 connected via an RJ45 multiple connector with the input/output socket of the interruption device 1 connected with computer 14. In the second case the computer 14 can continue to exchange data with the local computer network 19. This latter possibility is of interest in particular when for certain reasons the computer 14 must remain in permanent connection with the local network 19, or when data exchange with this local network 19 is regarded as sufficiently safe.

In another application variant one could transmit the data exchanged between the computers of the local network 13 and the Internet 17 via the first group of wires of the RJ45 cables of the local network 13, and the data exchanged between the computers of the local network 13 via the second group of wires. Thus, in the open position the interruption device 1 would protect computer 14 against computer intrusions from the Internet 17 while letting through the data exchanged between computer 14 and the other computers of the local network 13.

Figure 4:
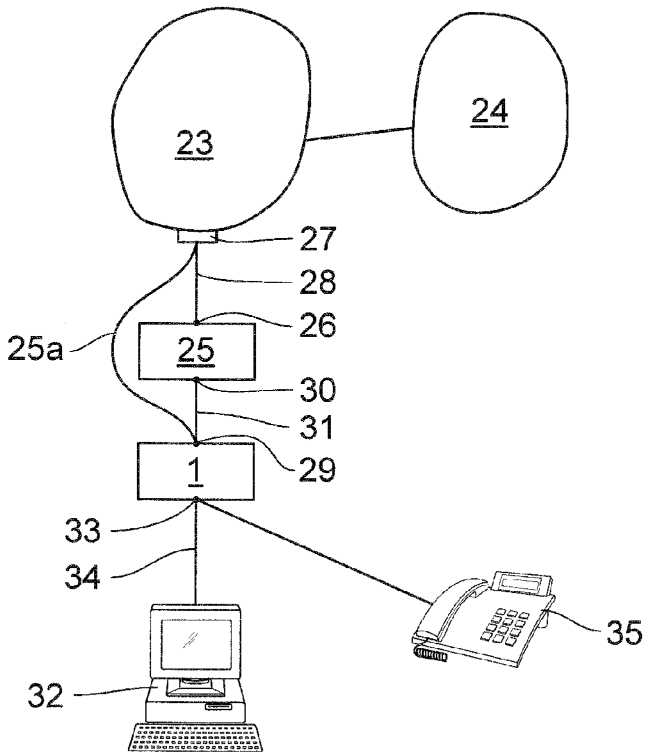
FIG. 4 is a scheme of another computer system comprising the interruption device according to the invention.

FIG. 4 shows another example of a computer system in which the interruption device 1 according to the invention can be used. This system comprises a public switched telephone network 23, a worldwide computer network (Internet) 24 linked with the public switched telephone network 23, an ADSL modem 25 having a first input/output socket 26 connected with the public switched telephone network 23 via a telephone socket 27 and a telephone cable 28, an interruption device 1 according to the invention having a first input/output socket 29 connected with a second input/output socket 30 of modem 25 via a cable 31 of the RJ45 type, and a computer 32 connected with a second input/output socket 33 of the interruption device 1 via a cable 34 of the RJ45 type. Between computer 32 and the modem 25, the first group of wires of cables 31, 34 transmits the data exchanged with the Internet 24. A cable 25*a* of the telephone or RJ45 type connects the telephone socket 27 directly with the first input/output socket 29 of the interruption device 1 in order to enable the exchange of telephone signals between the public switched telephone network 23 and a telephone 35 connected with the second socket 33 of the interruption device 1 via a multiple connector, which telephone signals cannot be processed by modem 25. Opening the interrupters 8 of the interruption device 1 for protection of computer 32 against computer attacks coming from the Internet 24 will not affect the communications between telephone 35 and the public switched telephone network 23.

Figure 5:
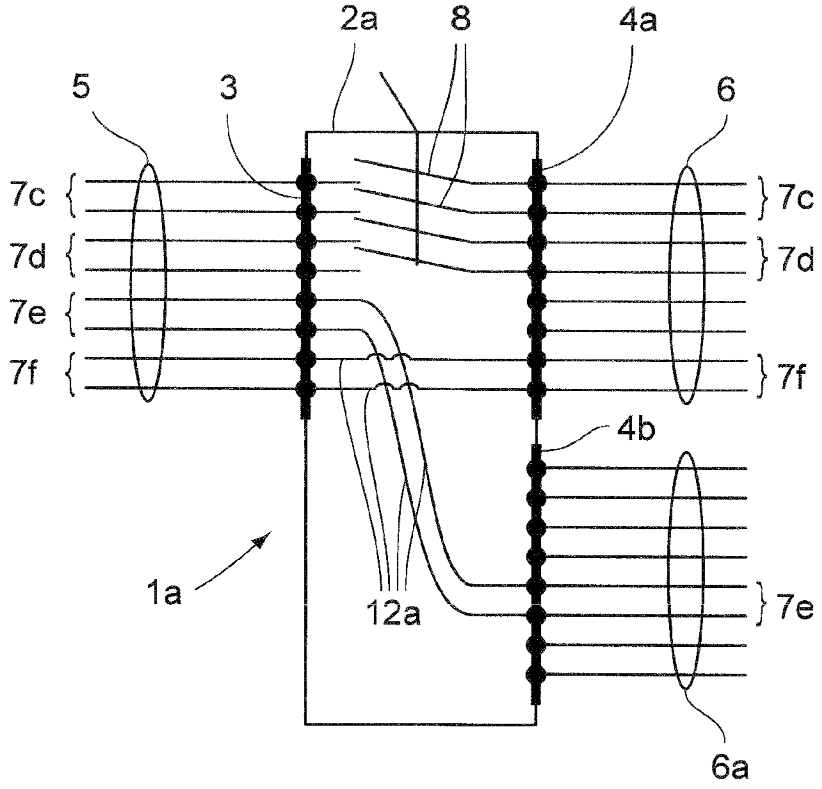
FIG. 5 is an electrical circuit of an interruption device according to a second embodiment of the invention.

FIG. 5 shows an interruption device 1*a* according to a second embodiment of the invention. This second embodiment differs from the embodiment illustrated in FIGS. 1 and 2 by one of the two input/output sockets 3, 4—here socket 4—being replaced by two separate RJ45 sockets 4*a*, 4*b*. Socket 4*a* is connected inside of box 2*a* with the interrupters 8 and inner conductors 12*a* that correspond to the orange 7*c*, green 7*d*, and brown 7*f* wire pairs, and is intended to be connected outside via cable 6 with a computer, while the other socket 4*b* is connected inside of box 2*a* only with the two inner conductors 12*a* that correspond to the blue wire pair 7*e*, and serves as a telephone socket intended to receive a plug of a third cable 6*a*. With this embodiment one can avoid using a multiple connector for connecting both a computer and a telephone with the interruption device. In a variant, socket 4*b* could be a socket specially conceived for the telephone, such as a RJ11 socket.

Figure 6:
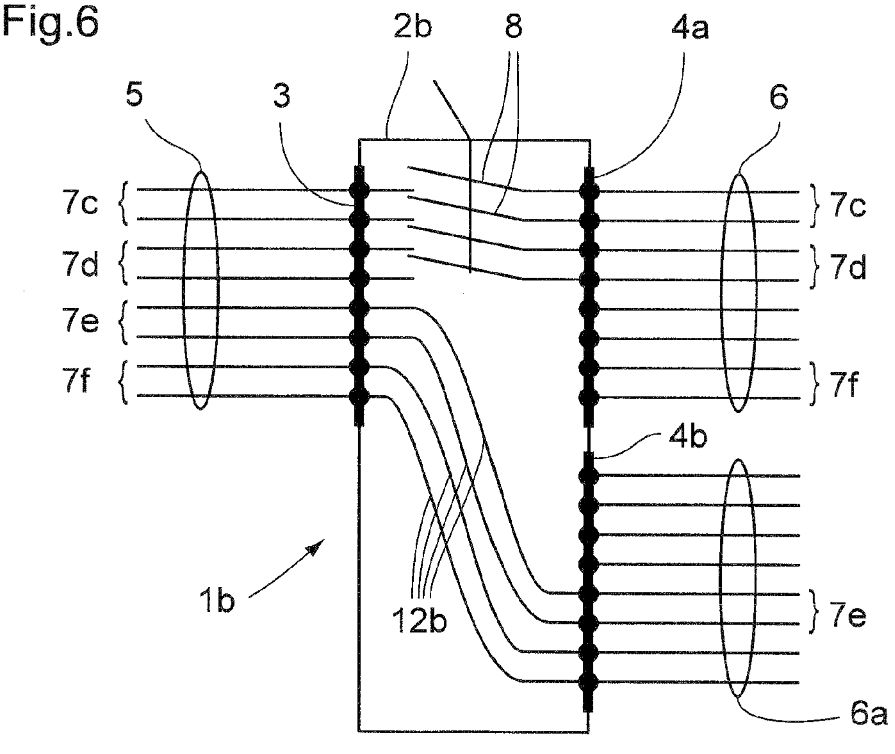
FIG. 6 is an electrical circuit of an interruption device according to a third embodiment of the invention.

FIG. 6 shows an interruption device 1*b* according to a third embodiment of the invention. This embodiment differs from the embodiment illustrated in FIG. 5, in that the inner conductors 12*b* corresponding to the brown wire pair 7*f* are connected inside of box 2*b* between socket 3 and socket 4*b*. Since socket 4*a* inside of box 2*b* is only connected with the interrupters 8, then in a variant the cable 6 that is plugged into this socket could have the first group of wires 7*c* and 7*d* only.

Figure 7:
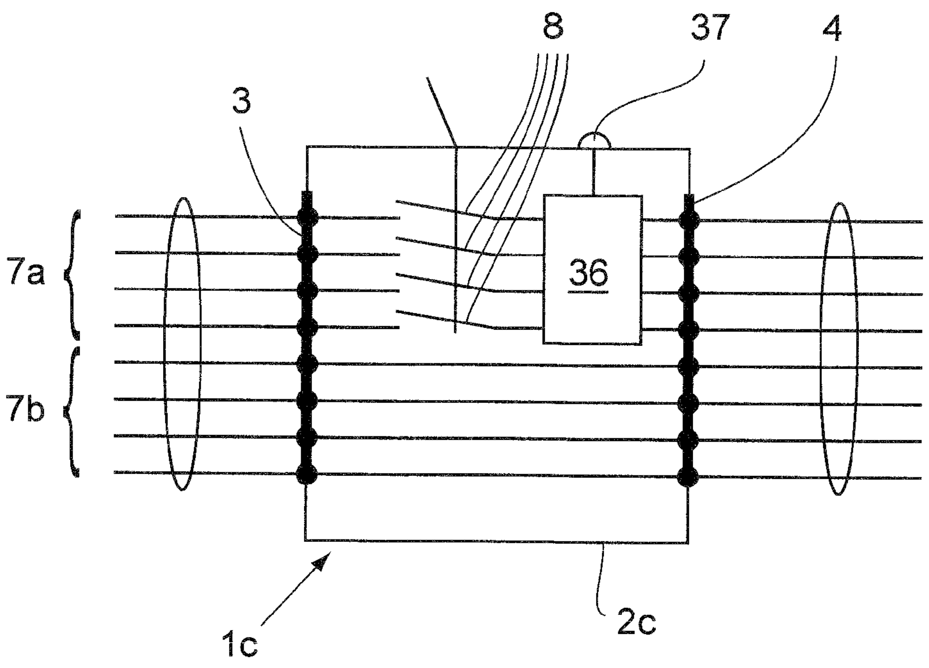
FIG. 7 is an electrical circuit of an interruption device according to a fourth embodiment of the invention.

FIG. 7 shows an interruption device 1*c* according to a fourth embodiment of the invention. In this embodiment the interruption device 1*c* comprises inside of box 2*c* a circuit 36 for detecting the data rate in the first group of wires 7*a*, and on an outside face of box 2*c* an electroluminescent diode 37 connected with circuit 36. The circuit 36 is of a type known per se. It is connected between the four interrupters 8 and one-4—of the input/output sockets 3, 4, and controls the blinking of electroluminescent diode 37 as a function of detected data rate. The user thus may permanently watch the data rate carried in the first group of wires 7*a*. An anomalously high data rate could signal that a computer intrusion is under way. The user could then immediately stop the intrusion by opening interrupters 8 of the interruption device.

Figure 8:
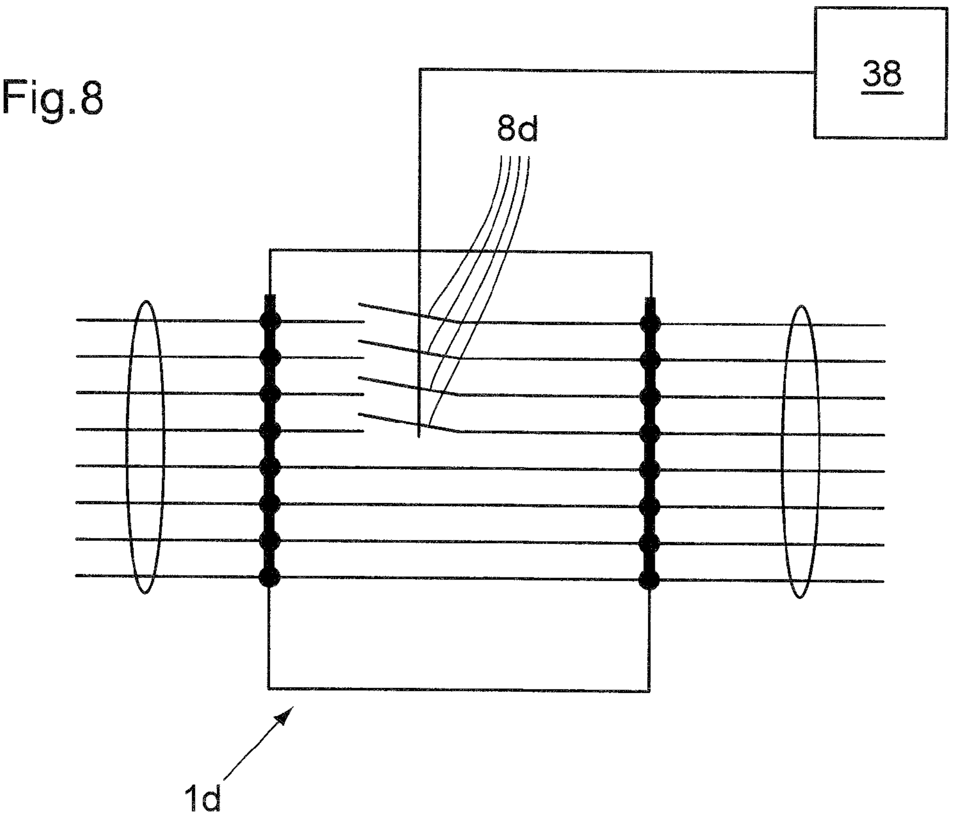
FIG. 8 is an electrical circuit of an interruption device according to a fifth embodiment of the invention.

FIG. 8 shows an interruption device 1*d* according to a fifth embodiment of the invention. In this embodiment the interrupters 8*d* of the interruption device 1*d* are relays controlled by a remote electrical source 38 such as a light switch, an alarm, or an electrical lock. Interrupters 8*d* may thus be opened automatically when the user leaves the room in which the interruption device 1*d* and the computer connected to it are located, more precisely when he switches off the room light, activates an alarm device, or closes an electrical lock providing access to the room.

The present invention has been described above only in exemplary fashion. It is obvious that modifications could be made without leaving the scope of the invention claimed. The interruption devices 1*a*, 1*b*, and 1*d* according to the second, third, and fifth embodiments of the invention could for example be equipped as well with a circuit for data rate detection and an electroluminescent diode. Besides, the present invention is applicable to other standards than the RJ45 standard, for instance to the USB standard. In this latter case, the interruption device would be comprised of two interrupters associated respectively with the wires of the green-white pair of the USB cables that transmits the computer data, and of transmission means without interrupters associated respectively with the red-black wire pair of the USB cables that transmits the supply voltage. Generally, the instant invention is not limited to a particular number of wires in the first and second wire groups of the communication line cables. Each of these first and second groups of wires could even include just one wire in applications where this is possible.

The invention claimed is:

1. Interruption device for a communication line, the communication line comprising first and second cables each comprising a first group of wire(s) for the transmission of computer data and a second group of wire(s) independent of said computer data, the interruption device comprising a box provided with first and second input/output sockets with which the first and second cables, respectively, can be connected, one or more interrupters, each connected between the first and second input/output sockets inside the box and actuable from outside the box, this/these interrupter(s) serving to connect/disconnect the wire(s) of the first group of the first cable respectively with/from the wire(s) of the first group of the second cable, and transmission means not comprising an interrupter and each connected between the first and second input/output sockets inside the box, these transmission means serving to connect the wire(s) of the second group of the first cable respectively with the wire(s) of the second group of the second cable.

2. Interruption device according to claim 1, wherein the interrupters number four and the transmission means consist of four conductors.

3. Interruption device according to claim 1, wherein the first and second input/output sockets are sockets of the RJ45 type.

4. Interruption device according to claim 1, further comprising means for detecting the rate of said computer data in the communication line, and visualization means informing the user of the detected rate.

5. Device according to claim 4, wherein the visualization means comprise an electroluminescent diode mounted on the box and controlled in such a way that its blinking be representative of the detected rate.

6. Interruption device according to claim 1, comprising a manual control member for actuating the interrupter(s).

7. Interruption device according to claim 1, wherein the interrupter(s) are relays.

8. Device comprising an interruption device according to claim 7 and an electrical source controlling the relay(s) of the interruption device, this electrical source consisting of one of the following elements: a light switch, an alarm device, an electrical lock.

9. Communication line comprising:

an interruption device according to claim 1, and the first and second cables being connected with the first and second input/output sockets, respectively of the interruption device.

10. Communication line according to claim 9, wherein the second group of wire(s) comprises at least one wire intended to carry telephone signals.

11. Communication line according to claim 9 wherein the second group of wire(s) comprises at least one wire intended to carry other computer data.

12. Computer network comprising at least one computer connected with a network socket via a communication line according to claim 9.

13. Interruption device for a communication line, the communication line comprising first and second cables each comprising a first group of wire(s) for the transmission of computer data, the first cable further comprising a second group of wire(s) independent of said computer data, the interruption device comprising:

a box provided with first, second, and third input/output sockets with which the first and second cables and a third cable, respectively, can be connected, one or more interrupters, each connected between the first and second input/output sockets inside the box and actuable from outside the box, this/these interrupter(s) serving to connect/disconnect the wire(s) of the first group of the first cable respectively with/from the wire(s) of the first group of the second cable, and transmission means not comprising an interrupter and each connected between the first and third input/output sockets inside the box, these transmission means serving to connect the wire(s) of the second group of the first cable respectively with one or more wire(s) of the third cable.

14. Communication line comprising an interruption device according to claim 13, and the first and second cables being connected with the first and second input/output sockets, respectively of the interruption device.

15. Interruption device according to claim 13, wherein the interrupters number four and the transmission means consist of four conductors.

16. Interruption device according to claim 13, wherein the first and second input/output sockets are sockets of the RJ45 type.

17. Interruption device according to claim 13, further comprising means for detecting the rate of said computer data in the communication line, and visualization means informing the user of the detected rate.

18. Interruption device according to claim 13, comprising a manual control member for actuating the interrupter(s).

19. Interruption device according to claim 13, wherein the interrupter(s) are relays.

20. Method of interrupting a transmission of computer data in a communication line comprising first and second cables in series each comprising a first group of wire(s) carrying said computer data and a second group of wire(s) independent of said computer data, according to which method one physically interrupts the link defined by the first group of wire(s) without interrupting the link defined by the second group of wire(s), by means of an interruption device connected between the first and second cables.

* * * * *